United States Patent [19]

Bonetti

[11] Patent Number: 5,758,167
[45] Date of Patent: May 26, 1998

[54] INTERRUPT MANAGEMENT UNIT AND A METHOD FOR IDENTIFYING AN INTERRUPT REQUEST HAVING THE HIGHEST PRIORITY

[75] Inventor: Roberto Bonetti, Bergamo, Italy

[73] Assignee: SGS-Thomson Microelectronics S.r.l., Agrate Brianza, Italy

[21] Appl. No.: 535,344

[22] Filed: Sep. 28, 1995

[30] Foreign Application Priority Data

Aug. 28, 1994 [EP] European Pat. Off. ............... 94830460

[51] Int. Cl.$^6$ .................. G06F 13/26; G06F 9/46
[52] U.S. Cl. ........................ 395/733; 395/868
[58] Field of Search ................. 395/733–742, 395/775, 868, 870; 370/85.6

[56] References Cited

U.S. PATENT DOCUMENTS

| 3,755,787 | 8/1973 | Henegar | 395/735 |
|---|---|---|---|
| 4,056,847 | 11/1977 | Marcantonio | 395/737 |
| 4,059,851 | 11/1977 | Nutter, Jr. et al. | 395/863 |
| 4,326,249 | 4/1982 | Godsey | 395/868 |
| 4,533,994 | 8/1985 | Harrill et al. | 395/860 |
| 5,083,261 | 1/1992 | Wilkie | 395/738 |
| 5,134,706 | 7/1992 | Cushing et al. | 395/725 |
| 5,247,622 | 9/1993 | Choi | 395/294 |
| 5,317,748 | 5/1994 | Shimuzu | 395/733 |
| 5,381,552 | 1/1995 | Dahlberg et al. | 395/737 |
| 5,481,728 | 1/1996 | Matsutani | 395/293 |
| 5,568,485 | 10/1996 | Chaisemartin | 370/85.6 |
| 5,613,128 | 3/1997 | Nigar et al. | 395/739 |

FOREIGN PATENT DOCUMENTS

| 0488036 | 6/1992 | European Pat. Off. | G06F 13/24 |
|---|---|---|---|
| 0489260 | 6/1992 | European Pat. Off. | G06F 13/26 |
| 0530066 | 3/1993 | European Pat. Off. | G06F 13/26 |

*Primary Examiner*—Gopal C. Ray
*Attorney, Agent, or Firm*—David V. Carlson; Bryan A. Santarelli; Seed and Berry LLP

[57] ABSTRACT

A management unit for microcontrollers equipped with a decoder for a plurality of interrupt channels, the unit being connected to a central processing unit of the microcontroller to decode and transfer thereto a single interrupt digital signal through the decoder, and comprises a first circuit portion for selecting homolog pairs of channels incorporating a modular chain of elements, each having a respective channel pair connected thereto. The first or selection portion is associated with a second decoding circuit portion, and the interrupt signal is a reform of the channel interrupt vector carrying higher priority in the channel pair selected by the chain.

21 Claims, 3 Drawing Sheets

INTERRUPT MANAGEMENT UNIT AND A METHOD FOR IDENTIFYING AN INTERRUPT REQUEST HAVING THE HIGHEST PRIORITY

TECHNICAL FIELD

This invention relates to an interrupt-channel management unit for microcontrollers.

More particularly, but not solely, the invention relates to a management unit for microcontrollers which are provided with a decoder of interrupt channels, and the ensuing description will make reference to this field of application for simplicity of illustration.

BACKGROUND OF THE INVENTION

As is well known, in the pertinent art of this invention, electronic microcontrollers are available which include a management unit for interrupt signal channels. In general, each channel connects the management unit to a sensor, a transducer, or a peripheral circuit outside the microcontroller.

Interrupt signals are digital signals which can be identified by a vector having a number of bits equal to the number of the channels. Such signals are intended to trigger, according to necessity, the running of an interrupt procedure within the central processing unit of the microcontroller. This central unit will also be referred to briefly as the CPU hereinafter.

Interrupt signals may carry different priorities; that is, one of them may be pre-eminent, or "win", over other requests for interrupts. Of course, a winning request would be served first.

Usually, there are discrete circuit portions called "macro-cells" within the microcontroller which may receive as an input a request for interrupt and can produce as an output a similar signal to the CPU. For example, FIG. 1 herein shows schematically the basic structure of a microcontroller 10 including a CPU 11, a counter 12, an interface 13, an A/D converter 14, and an interrupt channel management unit 15. The macro-cells 12, 13, 14 and 15 are all connected to the CPU to transfer a respective interrupt signal.

Now, taking into consideration just the management unit 15 for the interrupt channels, it matters to observe that the CPU will "see" this unit 15 as a single macro-cell capable of generating a single interrupt signal carrying a given priority.

However, in order for the unit 15 to effectively perform its function, it should in itself be capable of recognizing and selecting which request of interrupt carries the highest priority of the many which are directed to it on the various channels.

Accordingly, the management unit must first perform a decoding to assess the winning channel from the many interrupt signals coupled to it, and then define the interrupt vector which is to be sent to the CPU.

This usually involves the implementation of a complex decoding structure which occupies a large circuit area on the microcontroller.

Such a decoding structure is commensurate to the number of the interrupt channels present in a given microcontroller. For example, four channels would require a decoder of a certain complexity, but double that number of channels would result in a decoding structure of extremely large bulk.

The current trend favors microcontrollers which can accept an ever larger number of interrupt channels, and this poses the problem of how to accommodate the expanding size of the channel-managing unit. For example, with eight channels, a decoder with $2^8=256$ cells would have to be provided to just have eight viable vectors output.

Up to now, only interrupt channel management units with a wired logic have been provided, i.e., structures "tailored" to suit a specific microcontroller having a predetermined number of channels.

Briefly, it has been impossible to match or transfer a management unit to other interrupt channel crossings of another microcontroller without its internal structure and size having to be radically changed.

SUMMARY OF THE INVENTION

An object of this invention is to provide an interrupt channel management unit which has structural and functional features whereby it can be used "adaptively", that is, readily adapted to other interrupt channel crossings to overcome the drawbacks with which prior art microcontrollers are beset.

In accordance with one aspect of the invention, an interrupt channel selector comprises a chain of modular elements which receive channel pairs to locate the "winning" pair, an interrupt vector being then located and reformed for the CPU within the winning pair.

BRIEF DESCRIPTION OF THE DRAWINGS

The features and advantages of a unit according to this invention will be apparent from the following detailed description of an embodiment thereof, given by way of example and not of limitation with reference to the accompanying drawings.

In the drawings.

DETAILED DESCRIPTION OF THE INVENTION

Figure 1:
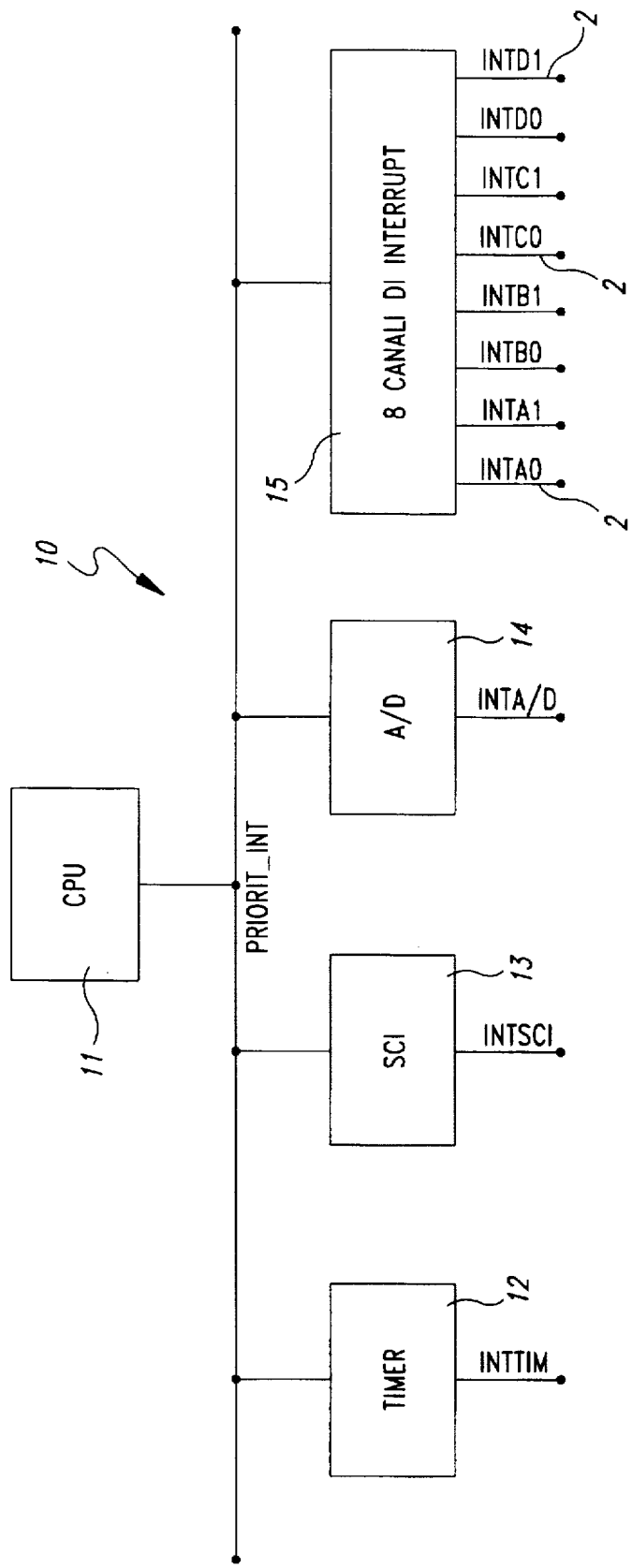
FIG. 1 shows schematically a known microcontroller incorporating an interrupt channel management unit.
Figure 2:
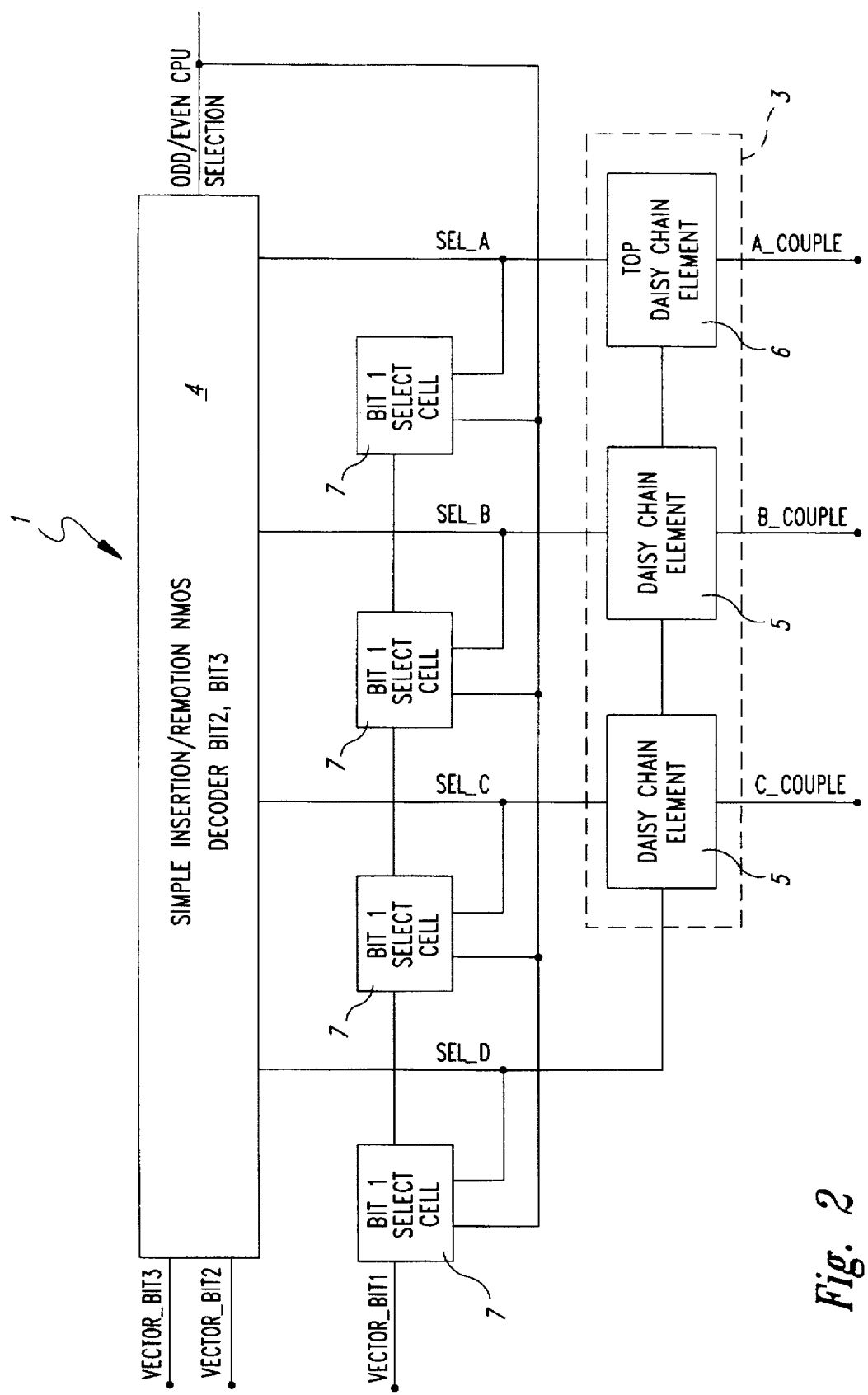
FIG. 2 shows schematically a management unit, as incorporated to the microcontroller in FIG. 1, which embodies this invention.

With reference to FIGS. 1 and 2, a management unit 1 for interrupt signal channels 2 embodies the invention and is incorporated into an electronic microcontroller 10. The management unit 1 corresponds to the unit 15 of FIG. 1, but unlike the unit 15, is formed according to the present invention.

Referring to FIG. 1, the microcontroller 10 includes a central processing unit or CPU 11, and a plurality of macro-cells 12, 13, 14, all connected to one input of the CPU, designated INT. The first macro-cell 12 is a counter block, or TIMER; the second macro-cell 13 is a serial interface SCI; and the third macro-cell 14 is an A/D converter. The CPU handles directly a priority "arbitration" step among the interrupt signals which are supplied to it by the macro-cells.

Referring to FIG. 2, the channel 2 management unit 1 is also incorporated into a macro-cell which is "seen" by the CPU 11 as a "supplier" of an interrupt signal. In this case, the unit 1 has a digital output which is provided on an eight-bit data bus connected to the CPU 11 and designated DRB.

It should be noted that the unit 1 may also be incorporated into the CPU 11, and hence, to a single integrated circuit.

Alternatively, the unit 1 may be designed for implementation as a separate integrated circuit which can be connected and matched to microcontrollers having different interrupt channel management requirements.

Referring again to FIG. 1, a plurality of channels 2 for interrupt signals are led to the management unit 1. In the embodiment being discussed herein by way of example, there are eight such channels 2, designated A0, A1, B0, B1, C0, C1, D0 and D1.

However, the channels 2 may well be a smaller number, e.g., four, or a larger number, e.g., sixteen. On this account, the aggregate of the channels will be designated 2N hereinafter.

Furthermore, it being convenient on occasions to analyze homolog channel pairs, i.e., even- and odd-numbered channels in one pair, reference will also be made hereinafter to N channel pairs rather than 2N channels.

Referring to FIG. 2, the management unit 1 for the N pairs of channels 2 comprises a first or selection circuit portion 3 and a second or decoding circuit portion 4. The first portion 3 includes a chain of elements 5 to which one of the N channel pairs is led.

This chain provides a daisy chain wherein each element 5 is effective to activate, or deactivate, the element next to it. It should be noted, however, that the initial block in the chain, denoted by 6, has a peculiar structure which is distinguished from the other elements 5 connected after it.

This feature makes the circuit portion 3 a hybrid daisy chain of sort, hereinafter referred to as a "bonny chain". It is important to observe, moreover, that the number of the elements 5 in the chain could be equal to the number N of channel pairs.

In actual practice, the number of the elements 5 in the chain would be N-2, because the initial block 6 cannot be taken to be identical with the other elements 5, and the last element 5 has been omitted since it can be isolated from the others by logic exclusion.

Figure 3:
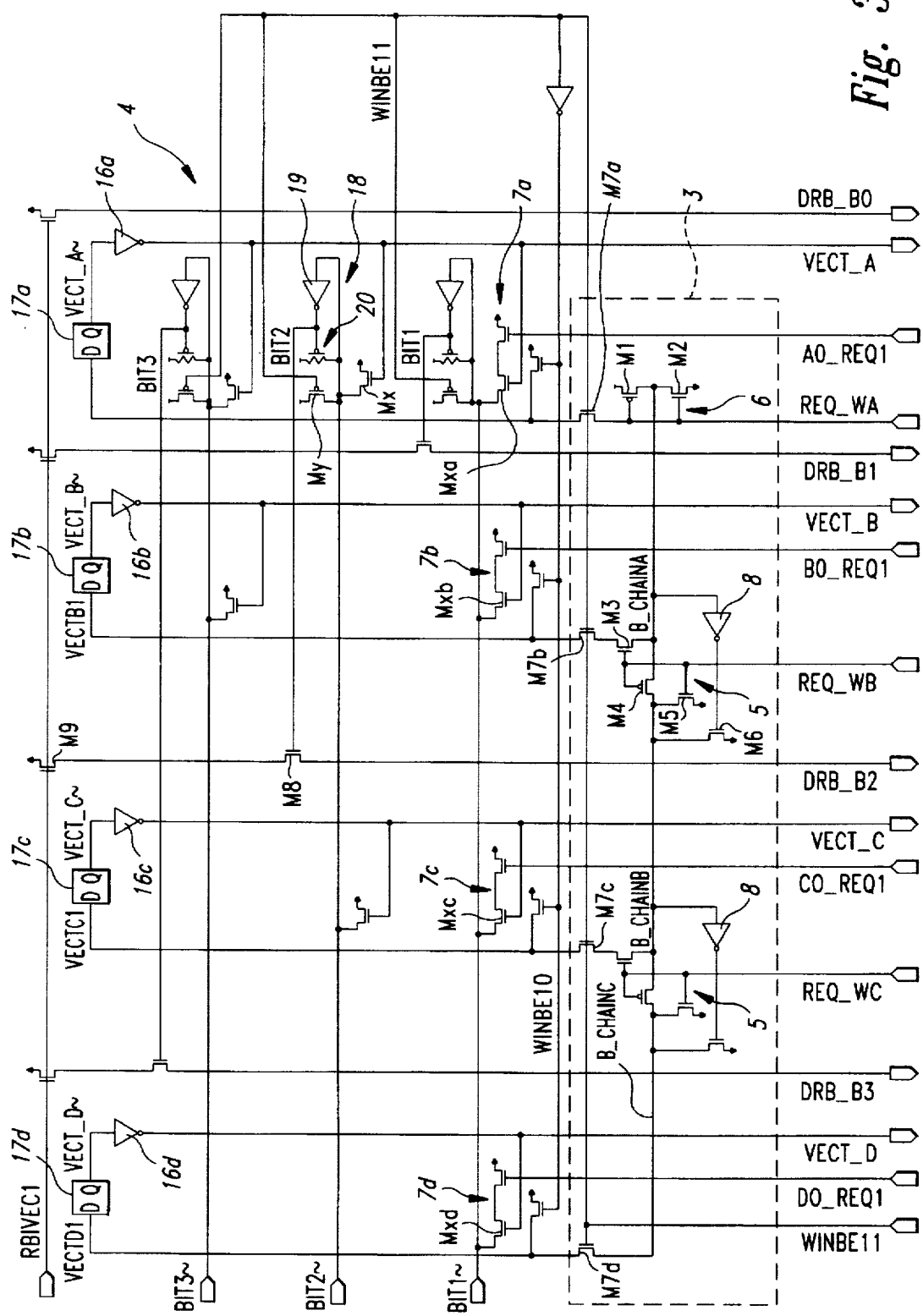
FIG. 3 is a diagram illustrating the internal structure of the unit of FIG. 2 in greater detail.

Referring to FIG. 3, the initial block 6 in the bonny chain comprises a CMOS inverter having a first or pull-up transistor M1 of the p-channel MOS type connected in series with a second or pull-down transistor M2 of the n-channel MOS type, which transistors are connected between a first supply voltage reference Vcc and a second voltage reference, such as a signal ground GND. The first transistor M1 has preferably a W/L (channel width/length) dimension of 10/1.5 µm, and the second transistor M2 has preferably a W/L dimension of 5/1.5 µm.

The initial block 6 pre-charges the bonny chain so as to initiate a sequential scanning of the signals present on the various pairs of interrupt channels.

In this respect, the respective gate terminals of the transistors M1 and M2 are both connected to one input line to which is applied a signal REQ-WA, which signal is re-initialized to ground by the microcontroller at the start of each instruction execution, that is before the "arbitration" step between macro-cells.

This input line is also connected to the decoding circuit portion 4, to be described, specifically to an input of a storage element 17, such as a latch, through an enable transistor M7a.

The interconnection point between the transistors M1 and M2 is basically the output of the initial block 6, which output is connected as shown to the input side of a first element 5 in the bonny chain.

That first element 5 includes an incoming signal line B-CHAIN-A wherein a p-channel MOS transistor M4 is connected which has its drain terminal connected to ground via an n-channel transistor M5. The last-mentioned transistor receives a signal REQ-WB on its gate terminal which contains information about the interrupt priority of the second channel pair B0, B1. This signal is also applied to the gates of the transistor M4 and an n-channel transistor M3. The transistor M3 connects the input line B-CHAIN-A to the decoding portion 4 through the enable transistor M7b.

The drain terminal of the transistor M4 is further connected to ground via an n-channel transistor M6 which receives the input signal from the line B-CHAIN-A on its gate terminal via an inverter 8.

The drain terminal of the transistor M4 also forms the output of the element 5, which output is connected to the input side of the next element 5 by a signal line B-CHAIN-B representing the input line for this next element 5.

All the cascaded elements 5 have the same structure; but, to avoid burdening FIG. 3 with too many references, only references for substantially identical components, as incorporated to substantially identical modular structures of both the circuit portion 3 and the circuit portion 4, have been shown in the Figure.

As mentioned above, the last element 5 in the chain corresponding to the N-th channel pair has been omitted, and accordingly, the output of the element 5 in the N-1 position is connected directly to the decode portion 4 through the transistor M7d only.

To now revert to the structure of the portion 4, it should be observed that to each element 5 or to the initial block 6 of the bonny chain there corresponds substantially an identical modular portion of the decoding circuitry. For example, all the transistors M7 associated with the input lines B-CHAIN are connected to a corresponding storage element 17. The output Q of the storage element 17 is transferred to the output through an inverter 16 to indicate the winning interrupt signal, e.g., VECT-A, for the initial block 6.

The signal output from the inverter 16 is also applied as input to the gate terminal of a transistor Mx in a complementary pair incorporated to a bit selection cell 7. The cells 7 are connected in cascade with one another. The gate terminal of the other transistor in the complementary pair is directly applied a signal which relates to the request for interrupt on an even-numbered channel, such as the signal A0-REQ1 for the channel A0 led to the block 6.

The source of the first transistor Mx in said pair feeds an output BIT line, designated BIT-1 in this particular case, which is intended for reforming a given bit in the "winning" interrupt vector. Also involved in the reforming or, to use a familiar expression in the pertinent art, in the vectorizing of the interrupt signal bits for the CPU, is a group 18 of active elements including an inverter 19, a high internal resistance transistor 20, and a p-channel transistor My. The inverter has an input connected to the BIT line and an output connected to the gate of the transistor 20 and the gate of a transistor M8.

This transistor M8 is in series with a transistor M9 which receives an enable signal 9 from the CPU 11 and is also designated ODD/EVEN CPU SELECTION in FIG. 2, to allow a data bus allocation signal DBR of the corresponding vector to be output.

The operation of the management unit 1 of this invention will be briefly reviewed next. The inverter M1, M2 of the initial block 6 pre-charges the whole bonny chain at the start of the execution of each instruction from the microcontroller by means of the signal REQ-WA, which is re-initialized to ground GND. Following the pre-charge step, the first element 5 in the chain, that is the preceding element in the direction of propagation of the signal, can be selected if the signals on the channels REQ-WA and/or REQ-WB and/or REQ-WC have a high logic value, i.e., equal to the supply voltage Vcc.

When such condition is met, the first element 5 will drive the inputs and outputs of all the other N-3 elements 5 which follow in the bonny chain to the ground value, thereby enabling the "winning" pair of interrupt channels. Thus, the first step allows that pair to be selected from the N possible interrupt pairs which is to be regarded as the winning pair.

At this time, the interrupt signal vectorizing step is carried out, which means that the winning channel must be selected from the pair of winning channels and the corresponding value of the interrupt vector written into the data bus of the microcontroller.

Using the value of the request signal of the pair (A0-REQ1, . . . , D0-REQ1), the channel to be selected is located within the winning pair. The corresponding value of the interrupt vector is then allocated to the data bus DRB through the various logic gates of the decoding portion 4.

A chart is reproduced, for illustration purposes only, herein below which shows the decode logic that allocates the value of the interrupt vector to the data bus DRB.

CHART:

| VECT | 0 | 1 | 2 | 3 | 4 | 5 | 6 | 7 |
|------|---|---|---|---|---|---|---|---|
| A0   | 0 | 0 | 0 | 0 |   |   |   |   |
| A1   | 0 | 1 | 0 | 0 |   |   |   |   |
| B0   | 0 | 0 | 1 | 0 |   |   |   |   |
| B1   | 0 | 1 | 1 | 0 |   |   |   |   |
| C0   | 0 | 0 | 0 | 1 |   |   |   |   |
| C1   | 0 | 1 | 0 | 1 |   |   |   |   |
| D0   | 0 | 0 | 1 | 1 |   |   |   |   |
| D1   | 0 | 1 | 1 | 1 |   |   |   |   |

Thus, the circuit structure of this invention does solve the technical problem, and achieves a number of advantages, a main one being that the management unit 1 can be matched to various types of microcontrollers having different interrupt channels. In fact, it will be sufficient to add or remove identical elements 5 to/from the selection bonny chain, and similar modular decode cells of the interrupt vector, of the channel pairs, to have the circuit adapted to all the logics having different interrupt channel crossings.

I claim:

1. An interrupt management unit, comprising:
   a prioritizer having a chain of modules that operate to prioritize a plurality of homolog pairs of interrupt signals, said modules serially arranged from a first module having a highest weight to a last module having a lowest weight, each module coupled to receive an interrupt request that correspond to a respective one of said homolog pairs, said each module operated to disable all of said other modules having a lower weight when said interrupt request is active, said each module operated to generate a win signal when said interrupt request is active in the interrupt signals that are coupled to all of the modules having a higher weight are inactive; and
   a decoder coupled to said prioritizer and coupled to receive a pair-select signal, said decoder operated to generate in response to said win signal and to said pair-select signal an interrupt vector corresponding to an interrupt signal that is selected by said pair-select signal and that belongs to the winning one of said homolog pairs that is coupled to the module that generates said win signal.

2. An interrupt management unit for identifying from a plurality of interrupt requests the request having the highest priority, comprising:
   a plurality of interrupt request lines;
   a prioritizer that has a chain of modules, said chain including,
      an initial module assigned a highest priority and having a request input coupled to a respective one of said interrupt request lines, a request output, and a control output, said initial module generating a win signal on said request output and a disable signal on said control output when an interrupt request is present on said one of said interrupt request lines, and
      one or more following modules that are serially coupled to said initial module and to each other, each following module assigned a priority lower than a priority of a preceding one of said initial or following modules, each of said following modules having a request input coupled to a respective one of said interrupt request lines, a request output, a control output, and a control input coupled to said control output of a preceding one of said initial or following modules, said each following module generating said disable signal on said control output when a respective one of said interrupt requests is present on said request input, said each following module generating said win signal on said request output when said respective interrupt request is present on said request input and an enable signal is present on said control input; and
   a decoder having a plurality of inputs respectively coupled to said request outputs of said initial and following modules and having one or more outputs, said decoder generating on said outputs a vector corresponding to the one of said initial and following modules that generates said win signal, said vector identifying said request having said highest priority.

3. The interrupt management unit of claim 2 wherein said interrupt requests are each associated with a respective homolog pair of interrupt signals, and wherein said decoder has a plurality of a select inputs each associated with a respective one of said initial and following modules, said decoder selecting a first of said pair of interrupt signals associated with said win signal when a first signal is present on an associated select input, said decoder selecting a second of said pair of interrupt signals when a second signal is present on said associated select input.

4. The interrupt management unit of claim 2 wherein said vector is a digital signal.

5. A management unit for microcontrollers equipped with a decoder for a plurality of interrupt channels, the unit being connected to a central processing unit of the microcontroller to decode and transfer thereto a single interrupt digital signal through said decoder, the unit comprising:
   a first circuit portion for selecting homolog pairs of channels, the first portion incorporating a modular chain of elements, each element having a respective channel pair connected thereto and coupled to receive a respective pair-select signal that is associated with the respective channel pair, the elements serially arranged according to priority, a first element in the chain having a highest priority, a last element in the chain having lowest priority, the single interrupt digital signal representing, and the first circuit portion selecting, a channel of the active channel pair that is coupled to the element having a higher priority than all of the other elements to which respective active channel pairs are coupled, said channel being selected by the respective pair-select signal that is received by said element having said higher priority, said first portion being associated with a second decoding circuit portion.

6. A management unit according to claim 5, wherein the interrupt signal is a digital interrupt vector that represents said selected channel, which carries higher priority in said active channel pair.

7. A management unit for microcontrollers equipped with a decoder for a plurality of interrupt channels, the unit connected to a central processing unit of the microcontroller to decode and transfer thereto a single interrupt digital signal through said decoder, said unit comprising:

- a first circuit portion for selecting homolog pairs of channels, said first circuit portion incorporating a modular chain of elements, each element having a respective channel pair connected thereto, said first portion being coupled to a decoding circuit portion; and
- said chain including an initial block effective to pre-charge the other elements connected after it.

8. A management unit according to claim 7, wherein said pre-charging initial block comprises a CMOS inverter whereto one of said channels is connected.

9. A management unit for microcontrollers equipped with a decoder for a plurality of interrupt channels, the unit being connected to a central processing unit of the microcontroller to decode and transfer thereto a single interrupt digital signal through said decoder, the unit comprising:

- a first circuit portion for selecting homolog pairs of channels, the first portion incorporating a modular chain of elements, each element having a respective channel pair connected thereto, the elements serially arranged according to priority, a first element in the chain having a highest priority, a last element in the chain having lowest priority, the single interrupt digital signal representing, and the first circuit portion selecting, the active channel pair that is coupled to the element having a higher priority than all of the other elements to which respective active channel pairs are coupled, said first portion being associated with a second decoding circuit portion; and
- wherein some of the chain elements are identical to one another, and wherein the number of identical modular elements in the chain is equal to the number of homolog channel pairs less two.

10. A management unit for microcontrollers equipped with a decoder for a plurality of interrupt channels, the unit being connected to a central processing unit of the microcontroller to decode and transfer thereto a single interrupt digital signal through said decoder, the unit comprising:

- a first circuit portion for selecting homolog pairs of channels, the first portion incorporating a modular chain of elements, each element having a respective channel pair connected thereto, the elements serially arranged according to priority, a first element in the chain having a highest priority a last element in the chain having lowest priority, the single interrupt digital signal representing, and the first circuit portion selecting, the active channel pair that is coupled to the element having a higher priority than all of the other elements to which respective active channel pairs are coupled, said first portion being associated with a second decoding circuit portion; and
- wherein the chain element having a higher priority will drive the inputs and outputs of all the other elements connected after it to a ground value.

11. A management unit for microcontrollers equipped with a decoder for a plurality of interrupt channels, the unit being connected to a central processing unit of the microcontroller to decode and transfer thereto a single interrupt digital signal through said decoder, the unit comprising:

- a first circuit portion for selecting homolog pairs of channels, the first portion incorporating a modular chain of elements, each element having a respective channel pair connected thereto, the elements serially arranged according to priority, a first element in the chain having a highest priority, a last element in the chain having lowest priority, the single interrupt digital signal representing, and the first circuit portion selecting, the active channel pair that is coupled to the element having a higher priority than all of the other elements to which respective active channel pairs are coupled, said first portion being associated with a second decoding circuit portion; and
- wherein some of the chain elements are identical to one another, and wherein each of the identical modular elements in the chain corresponds to a respective element of a daisy chain.

12. A management unit for microcontrollers equipped with a decoder for a plurality of interrupt channels, the unit being connected to a central processing unit of the microcontroller to decode and transfer thereto a single interrupt digital signal through said decoder, the unit comprising:

- a first circuit portion for selecting homolog pairs of channels, the first portion incorporating a modular chain of elements, each element having a respective channel pair connected thereto, the elements serially arranged according to priority, a first element in the chain having a highest priority, a last element in the chain having lowest priority, the single interrupt digital signal representing, and the first circuit portion selecting, the active channel pair that is coupled to the element having a higher priority than all of the other elements to which respective active channel pairs are coupled, said first portion being associated with a second decoding circuit portion; and
- wherein each of the chain elements corresponds to a respective modular structure of the decoding circuit portion, each of the modular structures being identical to one another.

13. A management unit according to claim 12, wherein the elements of said chain are connected to each respective modular structure of the decoding portion through a respective bit-selection cell feeding an output line.

14. A management unit according to claim 13, wherein said cells are connected in cascade on the output line.

15. A management unit for microcontrollers equipped with a decoder for a plurality of interrupt channels, the unit connected to a central processing unit of the microcontroller to decode and transfer thereto a single interrupt digital signal through said decoder, the unit comprising:

- a first circuit portion for selecting homolog pairs of channels, the first portion incorporating a modular chain of elements, each element having a respective channel pair connected thereto, said first portion being associated with a decoding circuit portion; and
- wherein the central unit of the microcontroller is connected to an input of the decoding circuit portion to transfer a read enable signal of said interrupt signal.

16. A microcontroller with a management unit for a plurality of interrupt channels, said unit including a decoder and being associated with a central processing unit of the microcontroller to decode and transfer thereto a single interrupt digital signal through the decoder, said unit comprising:

a first circuit portion for selecting homolog pairs of channels, the first portion incorporating a modular chain of elements, each element having a respective channel pair connected thereto and coupled to receive a respective pair-select signal that is associated with the respective channel pair, the elements serially arranged according to priority, a first element in the chain having a highest priority, a last element in the chain having lowest priority, the single interrupt digital signal representing, and the first circuit portion selecting, a channel of the active channel pair that is coupled to the element having a higher priority than all of the other elements to which respective active channel pairs are coupled, said channel being selected by the respective pair-select signal that is received by said element having said higher priority, said first portion being associated with a second decoding circuit portion.

17. A microcontroller with a management unit for a plurality of interrupt channels, said unit including a decoder and being associated with a central processing unit of the microcontroller to decode and transfer thereto a single interrupt digital signal through the decoder, said unit comprising:

a first circuit portion for selecting homolog channel pairs, the first portion incorporating a modular chain of elements, each element having a respective channel pair connected thereto, said first circuit portion being associated with a second decoding circuit portion; and wherein said chain has an initial block effective to precharge the following elements connected thereto.

18. A method for identifying from a plurality of pairs of interrupt requests the pair that has the highest priority, comprising:

coupling each of a plurality of request signals to a respective one of a plurality of modules, each module weighted with a different priority level, each request signal associated with a respective one of the pairs of interrupt requests;

generating a win signal with the module having the highest priority level;

disabling the other modules having lower priority levels; and generating in response to the win signal an interrupt signal that identifies the pair of interrupt requests having the highest priority;

coupling each of a plurality of pair-select signals to a respective one of the modules, each of the pair-select signals associated with a respective one of the pairs of interrupt requests; and generating the interrupt signal such that it identifies the selected interrupt request from the pair having the highest priority, the generating performed in response to the pair-select signal that is coupled to the module having the highest priority level.

19. A method for identifying from a plurality of pairs of interrupt requests the pair that has the highest priority, comprising:

coupling each of a plurality of request signals to a respective one of a plurality of modules, each module weighted with a different priority level, each request signal associated with a respective one of the pairs of interrupt requests;

generating a win signal with the module having the highest priority level;

disabling the other modules having lower priority levels; and generating in response to the win signal an interrupt signal that identifies the pair of interrupt requests having the highest priority; and initializing the modules before coupling the request signals to the modules.

20. A method for identifying from a plurality of pairs of interrupt requests the pair that has the highest priority, comprising:

coupling each of a plurality of request signals to a respective one of a plurality of modules, each module weighted with a different priority level, each request signal associated with a respective one of the pairs of interrupt requests, each request signal having an active level and an inactive level;

generating a win signal with a winning module that has the highest priority level among those of the modules that are coupled to respective request signals having said active level;

disabling all of the modules having lower priority levels than the winning module;

generating in response to the win signal an interrupt signal that identifies the pair of interrupt requests having the highest priority;

coupling each of a plurality of pair-select signals to a respective one of the modules, each of the pair-select signals associated with a respective one of the pairs of interrupt requests; and generating the interrupt signal such that it identifies the selected interrupt request from the pair having the highest priority, the generating performed in response to the pair-select signal that is coupled to the winning module.

21. A method for identifying from a plurality of pairs of interrupt requests the pair that has the highest priority, comprising:

coupling each of a plurality of request signals to a respective one of a plurality of modules, each module weighted with a different priority level, each request signal associated with a respective one of the pairs of interrupt requests, each request signal having an active level and an inactive level;

generating a win signal with a winning module that has the highest priority level among those of the modules that are coupled to respective request signals having said active level;

disabling all of the modules having lower priority levels than the winning module;

generating in response to the win signal an interrupt signal that identifies the pair of interrupt requests having the highest priority; and initializing the modules before coupling the request signals to the modules.

* * * * *